(12) United States Patent
Nelson et al.

(10) Patent No.: US 9,269,943 B1
(45) Date of Patent: Feb. 23, 2016

(54) BATTERY HOUSING WITH REVERSE POLARITY PROTECTION

(71) Applicant: EXELIS, INC., McLean, VA (US)

(72) Inventors: John Carl Nelson, Roanoke, VA (US); Robert Charles Anderson, Daleville, VA (US); Shannon William Craighead, Roanoke, VA (US); Dmitru Branisteanu, Roanoke, VA (US)

(73) Assignee: Exelis, Inc., Herndon, VA (US)

( * ) Notice: Subject to any disclaimer, the term of this patent is extended or adjusted under 35 U.S.C. 154(b) by 199 days.

(21) Appl. No.: 13/774,165

(22) Filed: Feb. 22, 2013

(51) Int. Cl.
*H01M 2/34* (2006.01)
*H01R 43/20* (2006.01)
*H01M 2/10* (2006.01)
*H01M 2/02* (2006.01)
*H01M 10/02* (2006.01)
*H01M 10/04* (2006.01)

(52) U.S. Cl.
CPC .............. *H01M 2/342* (2013.01); *H01R 43/20* (2013.01); *H01M 2/022* (2013.01); *H01M 2/0262* (2013.01); *H01M 2/0267* (2013.01); *H01M 2/0277* (2013.01); *H01M 2/10* (2013.01); *H01M 2/1022* (2013.01); *H01M 2/1055* (2013.01); *H01M 10/02* (2013.01); *H01M 10/04* (2013.01)

(58) Field of Classification Search
CPC ........... H01M 2/1022; H01M 2/1055; H01M 2/0262; H01M 2/0277; H01M 2/10; H01M 10/02; H01M 10/04; H01M 2/022; H01M 2/0267; H01M 2/00; H01M 2200/00; H01M 2200/30; H01M 2/342; H01R 43/20
USPC .............................................. 429/163, 167, 1
See application file for complete search history.

(56) References Cited

U.S. PATENT DOCUMENTS

2004/0151963 A1* 8/2004 Buchanan et al. .............. 429/34

* cited by examiner

*Primary Examiner* — Jonathan Jelsma
*Assistant Examiner* — Omar Kekia
(74) *Attorney, Agent, or Firm* — RatnerPrestia (57) ABSTRACT

A battery housing includes a contact cage forming a longitudinal cylindrical enclosure having a lateral opening. A leaf spring is included having first and second compressible ends, in which the first end is received by the contact cage through the lateral opening. A longitudinal insulating cup is also included having opposing cylindrical openings, in which the second compressible end of the leaf spring is received by the insulating cup through one of the cylindrical openings. The leaf spring forms a positive terminal in the battery housing and is held in position by the contact cage and the insulating cup.

15 Claims, 11 Drawing Sheets

BATTERY HOUSING WITH REVERSE POLARITY PROTECTION

TECHNICAL FIELD

This invention relates to battery containers, in general. More particularly, it relates to a battery housing for holding a single battery used to power an electronic device. The battery housing includes a terminal assembly with reverse polarity protection.

BACKGROUND OF THE INVENTION

Many electrical devices require one or more batteries to operate. One such electrical device is a night vision device which allows military and law enforcement personnel to conduct operation in low light or at night. Another example of a device containing a battery is a digital camera.

Figure 1:
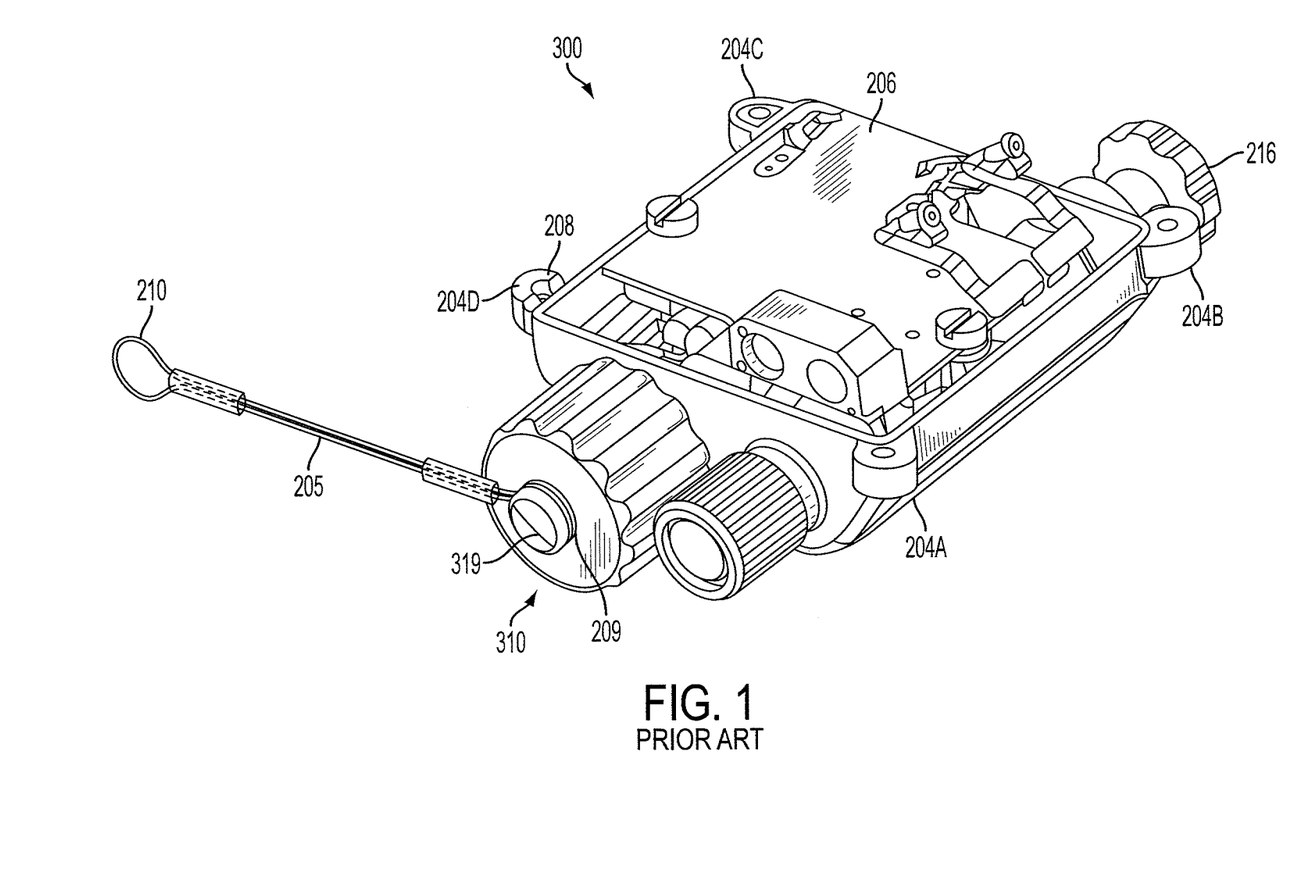
FIG. 1 is a bottom perspective view of a conventional single battery housing assembly.
Figure 2:
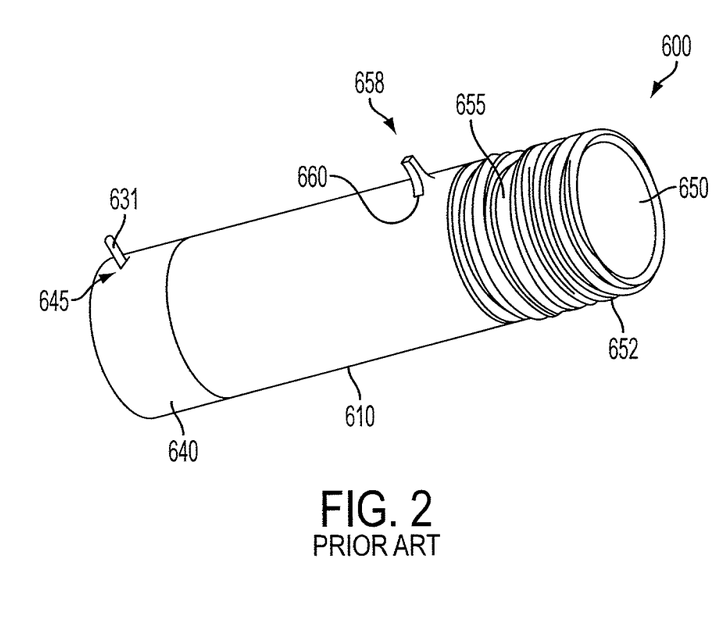
FIG. 2 is a perspective assembled view of a conventional battery sleeve assembly showing the positive and negative connectors to the battery.

An example of a conventional device including a single battery housing is shown in FIGS. 1 and 2. The battery housing includes a 1.5 volt AA battery which provides sufficient power to operate an image intensifier of a night vision goggle system. FIG. 1 shows a single battery housing assembly 300, which includes an on/off switch 216, electronics assembly 206, and a battery cap assembly 310. Fastener posts 204A, 204B, 204C and 204D enable the single battery housing assembly to be connected to a monocular housing assembly. FIG. 1 also shows a lanyard 205 coupled to a lanyard retention post 319. Lanyard 205 has loops 209 and 210 at respective ends. Loop 209 may be placed under post 319. A portion of the lanyard between loops 209 and 210 may be placed in groove 208 of post 204D. When the monocular housing assembly (not shown) is connected to single battery housing assembly 300 with fasteners in posts 204A, 204B, 204C and 204D, lanyard 205 may be clamped into groove 208. When battery cap assembly 310 is removed, lanyard 205 and battery cap assembly 310 may not be misplaced because lanyard 205 is captured by groove 208.

FIG. 2 shows an assembled battery sleeve assembly 600. When the components of the battery sleeve assembly are assembled, positive connector 631 of a leaf spring (not shown) protrudes from spring insulator 640 through hole 645 and negative connector 658 projects from the outer surface of battery sleeve 610. Negative connector 658 and positive connector 631 make appropriate connections with a flex circuit of the monocular night vision device and with the negative and positive terminals of a battery inside the battery assembly. Positive connector 631 and negative connector 658 are aligned parallel to the longitudinal axis of battery assembly housing 600.

Battery sleeve 610 has an open end 650. Battery sleeve 610 may be a single conducting cylinder that is machined into multiple segments. Segment 652, which may comprise about 10% of the total length of battery sleeve 610, is externally threaded and forms open end 650. The external threads of segment 652 interface with internal threads on battery cap assembly 310. Immediately adjacent to segment 652 is shown o-ring groove 655. When battery cap assembly 310 threads onto the external threads of segment 652, battery cap assembly 310 extends over segment 652 and interfaces with o-ring groove 655 to form an environmental seal which prevents the battery housing assembly from being impacted by any type of moisture including salt water, sand and dust.

Figure 3A:
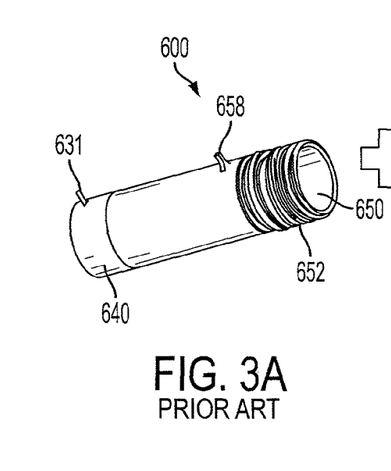
FIG. 3A is a perspective view of a conventional battery sleeve assembly.
Figure 3B:
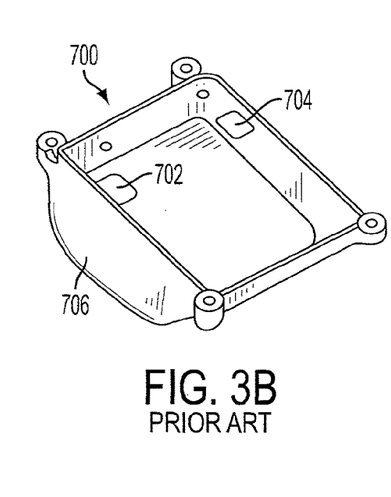
FIG. 3B is a perspective view of an over molded portion for the battery sleeve assembly of FIG. 3A.
Figure 3C:
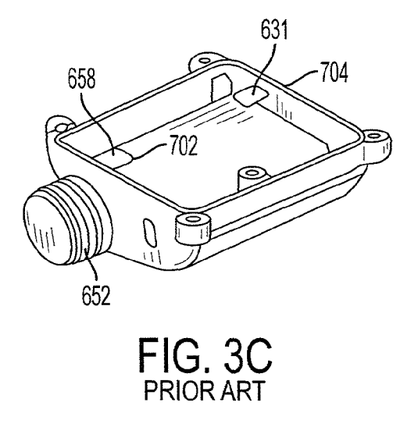
FIG. 3C is a perspective view of the battery sleeve inside the overmolded portion shown in FIG. 3B.

Referring next to FIGS. 3A, 3B and 3C, once the battery sleeve assembly 600 is assembled, it is inserted into an injection mold tool which creates battery housing 700 around the assembly by an overmolding process. During the overmolding process, a liquid high temperature, conductive plastic glows into the injection mold tooling, wraps around the battery sleeve assembly, and fills all voids in the injection mold tooling cavity.

At the conclusion of the mold-around process, battery sleeve assembly housing 600 is inside battery housing 700 and forms the battery housing/sleeve assembly. At the completion of the mold-around process, end 650 and segment 652 of battery sleeve assembly 600 protrude from opening 706 (see FIG. 3C) in battery housing 700, and end portion 640 is inside battery housing 700 and cannot be seen outside the battery housing. The inside of battery housing 700 may have two breakthroughs 702, 704, so that positive connector 631 may protrude from breakthrough 704 and negative connector 658 may protrude from breakthrough 702. The protruding connectors are shown in FIG. 3A. After the overmolding process has been completed, a separate adhesive seal is applied around positive connector 631 and/or around negative connector 658. The adhesive seal creates an environmental seal between spring insulator 640 and positive connector 631.

A disadvantage of the battery sleeve shown in FIG. 2 is that battery sleeve assembly 600 is a machined part that includes an integral ground post, or negative terminal 658, that requires additional machining time. It also includes an end cap portion 640 that must be pressed onto battery sleeve 610. Once pressed onto battery sleeve 610, the whole sleeve assembly 600 is overmolded in battery housing 700. In addition, the inside of end cap 640 includes a positive contact spring (not shown) and an insulating washer (not shown), which are also overmolded in the same process.

The machined end cap 640 and the machined long battery sleeve 610 with milled contact post 658 require a larger rod of metal and greater machining time. This results in additional costs. The overmolding process requires hand loading of the battery sleeve assembly 600 into the mold and requires costly inspection during the molding process.

Another disadvantage is that the end cap portion 640, which conventionally is made of aluminum, requires expensive complicated multiple pieces and a contact cap for forming the positive terminal. Furthermore, the negative terminal 658, because it is an integral part of sleeve 610, requires a difficult soldering process to a wire (not shown). The integral negative terminal 658 acts as a large heat sink for sleeve 610, which pulls down the temperature of the solder iron.

As will be explained the present invention overcomes the aforementioned disadvantages by providing a battery housing that has a reduced number of parts, does not require overmolding, does not require an end cap made of metal, and does not require an integral negative battery terminal.

SUMMARY OF THE INVENTION

To achieve these and other objects and in view of its purposes, the present invention provides a battery housing for use with an electronic device and configured to contain a replaceable battery. The housing comprises a battery holder for retaining a single battery and configured to be carried in the housing. The battery holder is operatively associated with electrical contacts for connecting the battery in an electrical circuit.

The present invention includes a battery housing comprising: (a) a contact cage forming a longitudinal cylindrical enclosure having a lateral opening; (b) a spring having first and second compressible ends, in which the first end is received by the contact cage through the lateral opening; and (c) a longitudinal insulating cup having opposing cylindrical openings, in which the second compressible end of the spring is received by the insulating cup through one of the cylindrical openings. The spring forms a positive terminal in the battery housing and is held in position by the contact cage and the insulating cup.

The battery housing includes a longitudinal sleeve for receiving a battery. A positive terminal of the battery is configured to contact the spring.

The contact cage of the housing includes split portions, each split portion having a respective pin and a respective receptacle. When the split portions are mated together, the contact cage is formed by engaging the respective pin of one split portion with the respective receptacle of the other split portion. The first compressible end of the spring is configured to provide a central spine for two split portions when mated together to form the contact cage. The spring includes a protruding tab extending from the first compressible end. The contact cage includes a slotted opening for permitting the protruding tab to extend through the slotted opening, when the first end of the spring is received in the contact cage.

One of the cylindrical openings is formed by an inward flange extending circumferentially from a cylindrical wall of the insulating cup. The second end of the spring is configured to abut the inward flange and center the spring in the insulating cup. The inward flange has a longitudinal thickness measured from an exterior surface of the insulating cup. The second end of the spring is recessed from the exterior surface of the insulating cup by the longitudinal thickness.

The battery housing also includes a longitudinal sleeve for receiving a battery. A positive terminal of the battery includes a centered nipple, and the nipple is configured to protrude into the longitudinal thickness of the inward flange and contact the second end of the spring. A negative terminal of the battery includes a flat surface. When the battery is inserted into the sleeve incorrectly, by the flat surface abutting the inward flange, the flat surface does not contact the positive terminal of the spring.

The other one of the cylindrical openings of the longitudinal insulating cup is formed by an outward flange extending circumferentially from a cylindrical wall of the insulating cup. The contact cage is configured to nestle the outboard flange, with the insulating cup protruding through the lateral opening of the contact cage.

Another embodiment of the present invention is a battery housing comprising: (a) a tubular sleeve for inserting a battery, wherein the battery includes positive and negative terminals at opposite ends of the battery; and (b) a compressible spring forming a positive electrical contact having first and second ends, in which the first end is held by a contact cage and the second end is held by an insulating cup. The contact cage forms a first cylindrical sleeve for holding the first end of the spring, and the insulating cup forms a second cylindrical sleeve for holding the second end of the spring. The insulating cup includes an outboard flange for fixing the insulating cup within a circumferential recess formed within the contact cage. The second end of the spring is configured to mate with the positive terminal of the battery.

The battery includes a nipple protruding from a flat surface for forming the positive terminal of the battery. The insulating cup includes an inward flange abutting the second end of the spring and providing a space between the second end of the spring and the flat surface of the battery. The nipple of the battery extends into the space formed by the inward flange and contacts the second end of the spring, thereby making electrical contact between the positive terminal of the battery and the positive electrical contact of the spring.

The contact cage is formed from two half cylinders, and each of the half cylinders includes a pin and a receptacle for inter-locking the two half cylinders to form the contact cage.

The spring is formed from an electrically conductive material. The contact cage is formed from an electrical insulated material. The insulating cup is formed from an electrical insulator material.

The contact cage is formed from two half cylinders, and each half cylinder is formed by injection molding.

The battery housing also includes a groove formed integrally on an exterior surface of the tubular sleeve, and a negative spring contact welded to the groove for forming the negative terminal of the battery. The weld is formed by electric resistance welding.

In still another embodiment of the present invention a method of making a positive terminal for a battery housing comprises the steps of:

(a) forming a compressible spring having first and second ends;

(b) forming two half cylinders, so that when fitted together provide a cylindrical contact cage;

(c) forming a cylindrical insulating cup;

(d) positioning the first end of the spring in one of the two half cylinders;

(e) positioning the second end of the spring within the insulating cup; and (f) fitting together the other half cylinder onto the one half cylinder and enclosing the first end of the spring.

The cylindrical contact cage and the insulating cup fix the compressible spring into position to provide an electrically positive terminal when in contact with a positive terminal of the battery.

The method may further include the steps of:

(g) forming an outboard flange circumferentially about a lateral end of the insulating cup;

(h) forming a circumferential recess within the cylindrical contact cage; and (i) positioning the outboard flange in the recess of the contact cage.

The insulating cup is fixed in position relative to the contact cage, and the spring is fixed in position between the insulating cup and the contact cage.

The method may further include the steps of;

(j) forming an inward flange circumferentially about another lateral end of the insulating cup, wherein the inward flange has a thickness in a direction perpendicular to the lateral end of the insulating cup; and (k) further positioning the second end of the spring within the insulating cup, so that a face of the second end of the spring abuts a lateral surface of the inward flange.

The thickness of the inward flange prevents an incorrect insertion of a flat negative terminal of the battery in making contact with the compressible spring.

It is understood that both the foregoing general description and the following detailed description are exemplary, but are not restrictive, of the invention.

BRIEF DESCRIPTION OF THE FIGURES

The invention may be best understood from the following detailed description when read in connection with the accompanying figures. It is emphasized that, according to common practice, the various features of the figures are not to scale. On the contrary, the dimensions of the various features are arbitrarily expanded or reduced for clarity.

DETAILED DESCRIPTION OF THE INVENTION

An exemplary embodiment of a single battery housing assembly of the present invention requires only a single AA battery (as an example) for operation. It will be understood by those skilled in the art that a battery with a different name, or a plurality of other batteries, may be used if their power, space, weight, and terminal configuration fit into the housing and are sufficient to energize an attached device. The battery housing assembly may include a voltage step-up circuit which may increase the 1.5 volt AA battery up to at least two volts which may provide sufficient power to operate a digital camera or an image intensifier, or any other electronics device. The housing assembly is designed in a way that makes it compact, rugged and ergonomically improved, and designed to provides an environmental seal and EMI shielding. The battery housing assembly also provides reverse polarity protection and a capability to maintain electrical contact with the battery during system shock and vibration.

Figure 4:
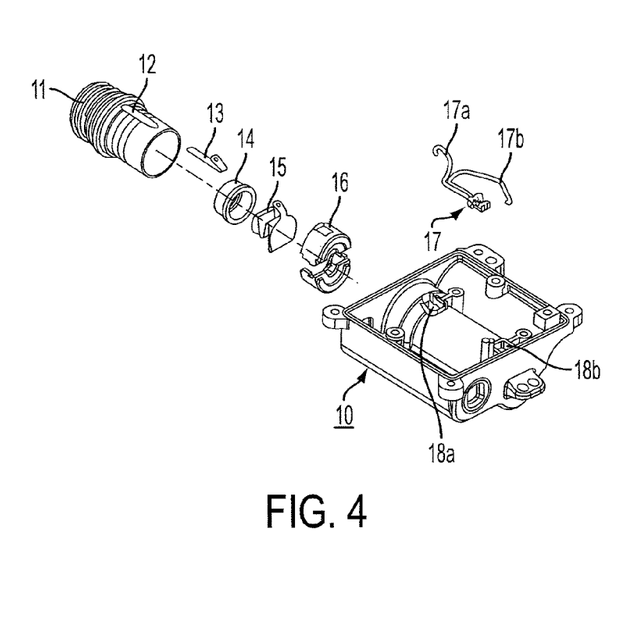
FIG. 4 is a perspective, exploded view of a battery housing assembly in accordance with an embodiment of the present invention.

Referring now to the figures, in which like reference numbers refer to like elements throughout the various figures, FIG. 4 shows an exemplary embodiment of a single battery housing assembly 10. FIG. 4 provides an exploded view of the single battery housing assembly 10, which includes battery sleeve 11, negative spring contact 13, insulating cup 14, leaf spring 15, and contact cage 16. These elements are further described below.

Battery sleeve 11 is a hollowed cylinder made from a conducting material, for example, brass. The battery sleeve includes mating groove 12 for positioning negative spring contact 13 onto battery sleeve 11. In an exemplary embodiment, the inside diameter of battery sleeve 11 may be sufficient to envelope a single AA battery. As another example, the conducting metal of battery sleeve 11 may be aluminum or any other material which is able to withstand high temperatures and high pressures.

Figure 5:
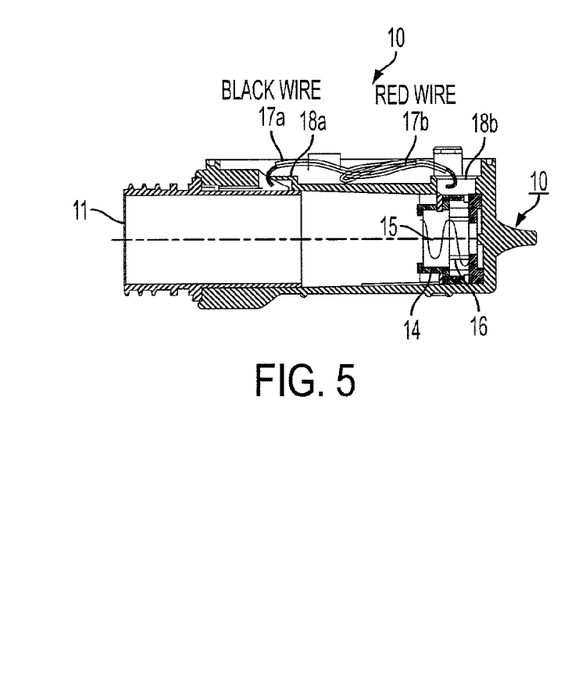
FIG. 5 is a cross sectional view of an assembled battery housing, the latter shown in FIG. 4 as an exploded view, in accordance with an embodiment of the present invention.
Figure 6:
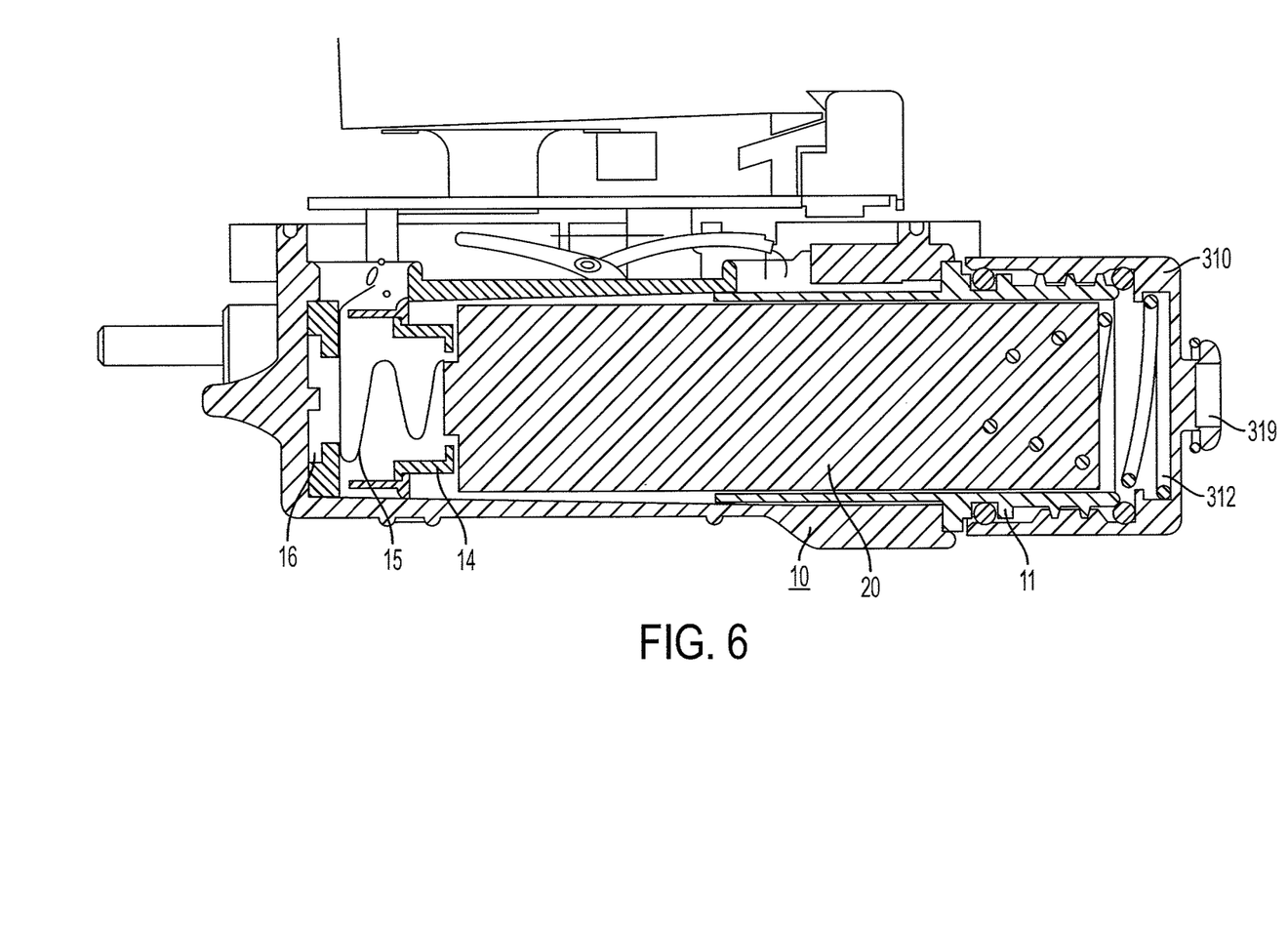
FIG. 6 is another cross sectional view of an assembled battery housing, in accordance with an embodiment of the present invention.

As best shown in FIGS. 5 and 6, insulating cup 14, leaf spring 15 and contact cage 16 are inserted into housing assembly 10. Housing sleeve 11 is also inserted into housing assembly 10 with its negative spring contact 13. The spring leaf 15 forms a positive terminal end for the battery and spring contact 13 forms a negative terminal for the battery. A battery cable assembly, generally designated as 17, shown in FIGS. 4 and 5, includes a black wire 17a which is soldered to negative spring contact 13, and a red wire 17b which is soldered to a tab protruding from leaf spring 15.

The breakthroughs shown in FIG. 4, which form part of housing assembly 10 and are generally designated as 18a and 18b, allow a tab of negative spring contact 13 and a tab of positive leaf spring 15, respectively, to protrude through housing assembly 10. The tabs allow the battery cable assembly 17 to be easily soldered, respectively, to negative spring contact 13 and positive leaf spring 15.

It will be appreciated that negative spring contact 13, which may be made of beryllium copper or any other suitable metal, is welded to a mating groove 12 using electric resistance welding. Although mating groove 12 is integral to sleeve 11 (which may be comprised of brass), nevertheless, the negative spring contact is easily welded to the mating groove portion of sleeve 11. Prior art techniques, as described with respect to FIG. 2, were difficult to solder because of the large heat sink presented by the sleeve body. This difficulty has been overcome by the present invention.

Referring next to FIG. 6, there is shown a battery, generally designated as 20, inserted within battery sleeve 11. The positive terminal of battery 11 contacts leaf spring 15 and the negative terminal of battery 11 contacts negative spring contact 13. A compressible spring 312, shown in cross-section in FIG. 6, is inserted within battery cap assembly 310. The battery cap assembly 310 including compressible spring 312 are better shown in FIG. 13. The compressible spring 312 contacts the negative terminal of battery 11 and completes electrical contact with the conductive material of the battery sleeve negative spring contact 13.

Figure 7:
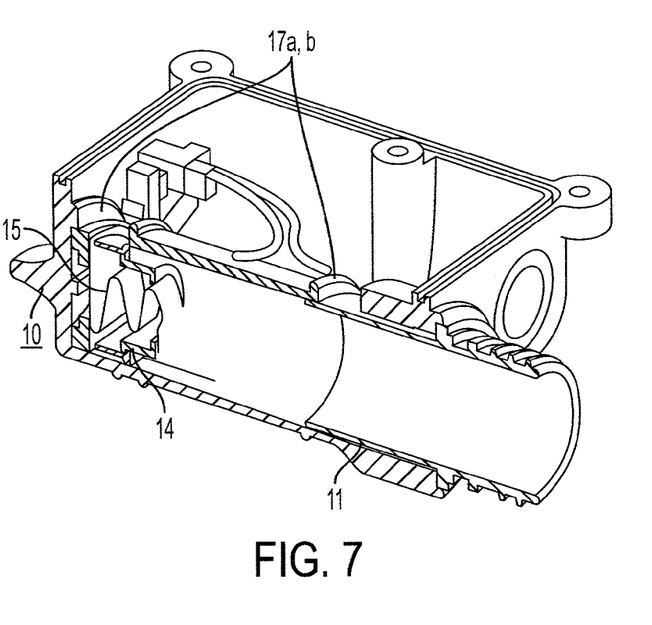
FIG. 7 is a perspective view of a cut portion of the battery housing, in accordance with an embodiment of the present invention.

Referring next to FIG. 7, there are shown cut-up views of housing assembly 10 including battery sleeve 11, insulating cup 14 and leaf spring 15. The relationship among these elements are further described later with respect to FIGS. 9 through 12. The battery cable assembly 17, as attached by solder onto end tabs of negative spring contact 13 and leaf spring 15, is also shown in FIG. 7.

Figure 8:
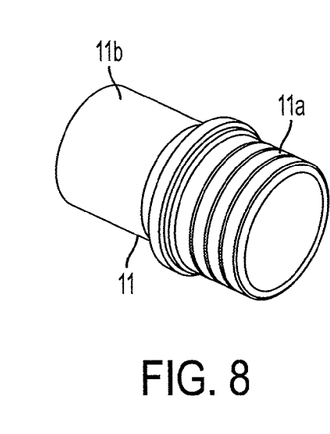
FIG. 8 is a perspective view of a battery sleeve that is inserted in the battery housing shown in FIG. 7, in accordance with an embodiment of the present invention.

Referring now to FIG. 8, there is shown a perspective view of battery sleeve 11. Battery sleeve 11 may be a single conducting cylinder that is machined into multiple segments. The external threads of segment 11a interface with the internal threads on battery cap assembly 310 (shown in FIGS. 6 and 13). The end segment 11b of battery sleeve 11, which is generally cylindrical, may be inserted into housing assembly 10, by pressure fitting battery sleeve 11 into a corresponding cylindrical opening of housing assembly 10.

Figure 9:
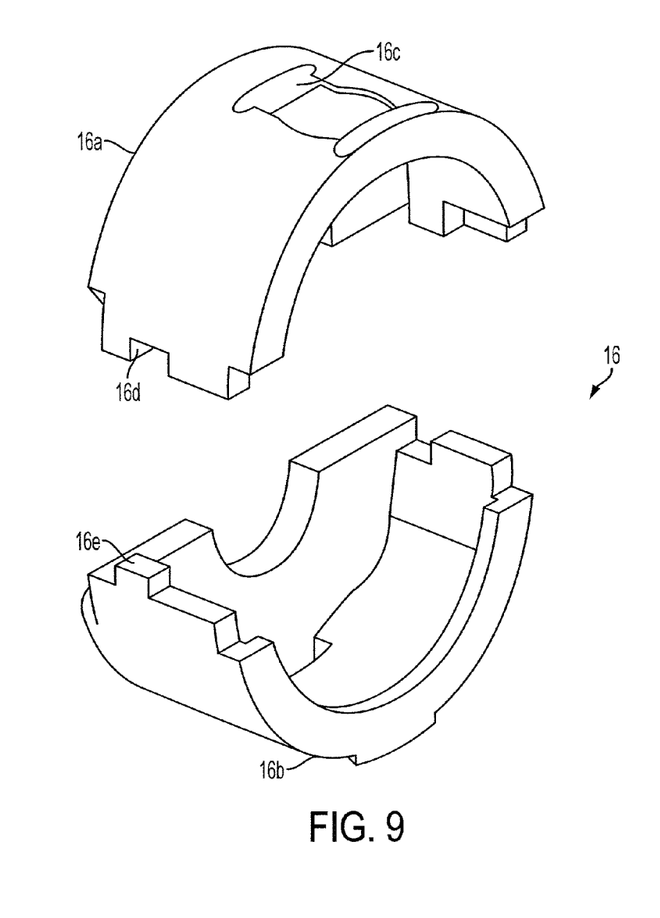
FIG. 9 is an exploded, perspective view of a contact cage, the latter shown in FIG. 4, in accordance with an embodiment of the present invention.

Referring next to FIGS. 9-12, the relationships among contact cage 16, leaf spring 15, and insulating cup 14 will now be described. Referring first to FIG. 9, there is shown contact cage 16 which is formed from two symmetrical split portions, each portion designated as 16a or 16b. Once split portion 16a is mated with split portion 16b, contact cage 16 may be defined as a longitudinal, cylindrical enclosure having a lateral opening. The two split portions may be latched together by way of receptacle and pin configurations, respectively designated 16d and 16e, as shown in FIG. 9. The pin configuration 16e is made to fit receptacle configuration 16d as the protruding pin is inserted into its matching receptacle. One end of contact cage 16 has a lateral opening, while the other end of the contact cage may be entirely closed.

Also shown in FIG. 9 is slotted opening 16c which allows the tab of leaf spring 15 to protrude from the slotted opening, as the leaf spring is received within the cylindrical opening of the contact cage. After protrusion of the tab through slotted opening 16c, red wire 17b may be soldered onto the tab of leaf spring 15 (as shown in FIGS. 4 and 5). This forms an electrical conductive path for the positive terminal of the battery and powers the circuits in the device.

Figure 10:
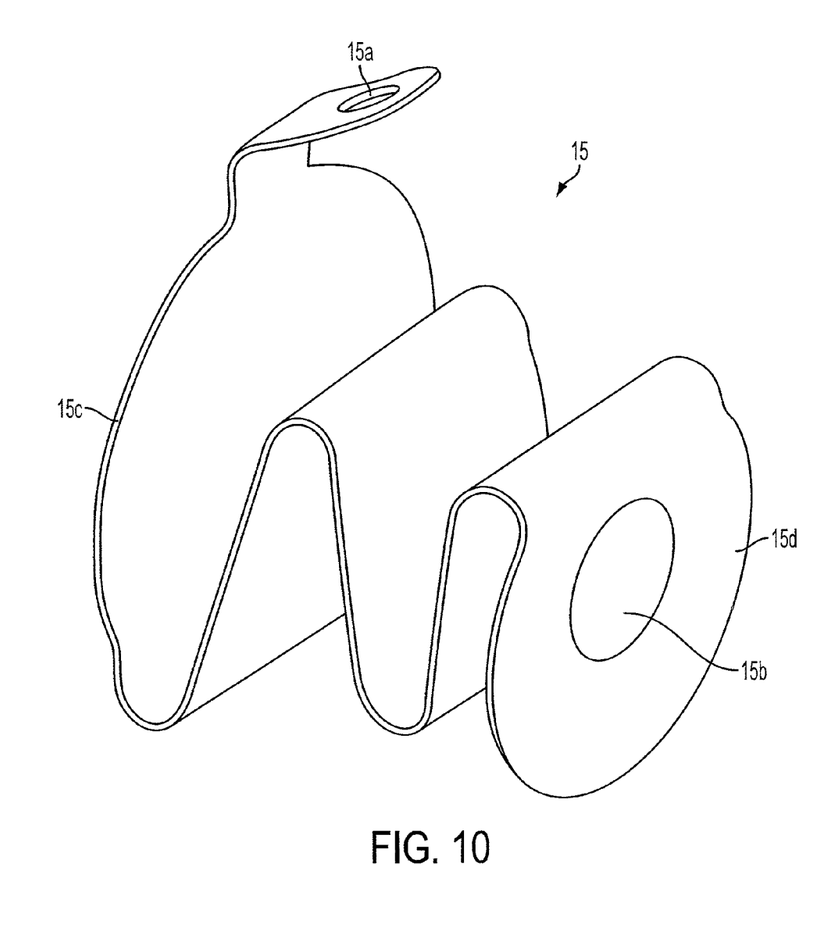
FIG. 10 is a perspective view of a leaf spring, the latter shown in FIG. 4, in accordance with an embodiment of the present invention.

FIG. 10 shows a perspective view of leaf spring 15. As shown, leaf spring 15 is a compressible longitudinal spring formed by a zigzag fold in a metallic conductor. Leaf spring 15 includes first and second lateral oriented, compressible ends, designated as 15c and 15d. The second lateral end 15d includes a dome, which is centered about its end face and is shown designated as 15b. The first lateral end 15c includes a projecting tab, designated as 15a, which may be soldered to red wire 17b, as shown in FIGS. 4 and 5.

Figure 11A:
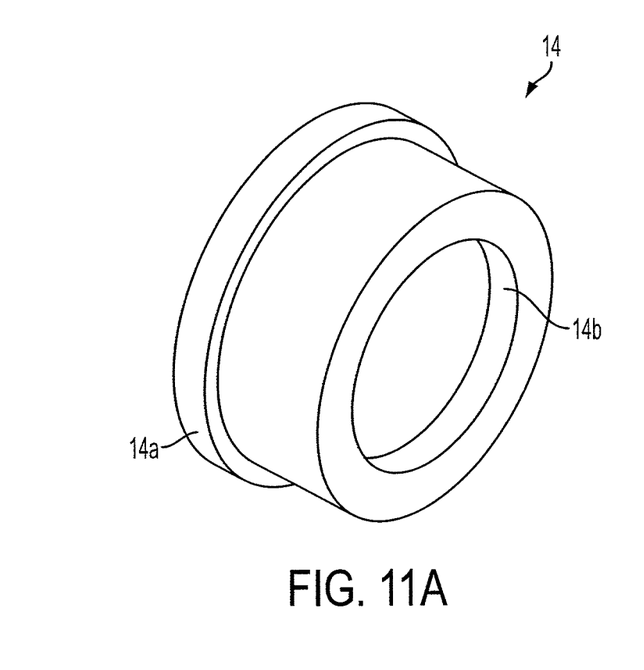
FIG. 11A is a perspective view of an insulating cup, the latter shown in FIG. 4, in accordance with an embodiment of the present invention.
Figure 11B:
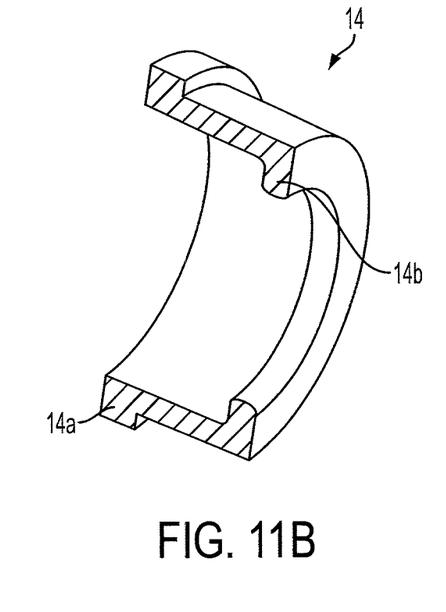
FIG. 11B is a cut portion of the insulating cup shown in FIG. 11A, in accordance with an embodiment of the present invention.

Referring next to the FIGS. 11A and 11B, there is shown insulating cup 14 which forms a generally cylindrical structure having opposing cylindrical, lateral openings. An outboard flange, designated as 14a, extends radially outward from a cylindrical wall of insulating cup 14 at one of the cylindrical lateral openings. An inward flange, designated as 14b, extends radially inward from the cylindrical wall of insulating cup 14 at the other cylindrical lateral opening. The outboard flange 14a and inward flange 14b are best shown in FIG. 11B, which provides a cut of the insulating cup shown in FIG. 11A.

Figure 12A:
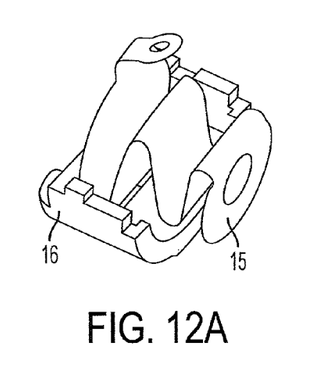
FIG. 12A shows a lower portion of the contact cage receiving a leaf spring, in accordance with an embodiment of the present invention.

The interrelationships among insulating cup 14, leaf spring 15 and contact cage 16 will now be described by referring to FIGS. 12A through 12E. FIG. 12A shows leaf spring 15 which includes its first lateral end received by one split portion of contact cage 16. Whereas FIG. 12A shows the first lateral end of leaf spring 15 received by a lower split portion of contact cage 16, FIG. 12C depicts the first lateral end of leaf spring 15 received by an upper split portion of contact cage 16. The upper split portion of contact cage 16 includes the slotted opening which permits tab 15a to protrude beyond and above contact cage 16.

Figure 12B:
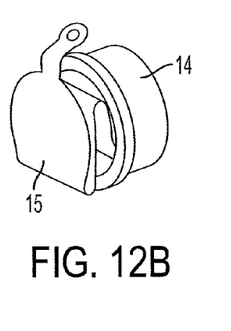
FIG. 12B shows a portion of the insulating cup receiving a leaf spring, in accordance with an embodiment of the present invention.
Figure 12C:
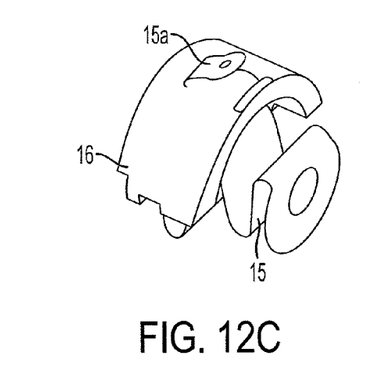
FIG. 12C shows an upper portion of the contact cage receiving a leaf spring, in accordance with an embodiment of the present invention.

FIG. 12B shows the second lateral end of leaf spring 15 received by insulating cup 14. As shown, however, the first lateral end of leaf spring 15 protrudes externally from one of the cylindrical openings of insulating cup 14.

Figure 12D:
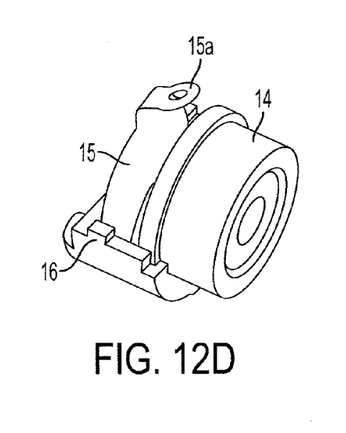
FIG. 12D shows a combination of the elements shown in FIGS. 12A and 12B, in accordance with an embodiment of the present invention.

It will be appreciated that when the two split portions of contact cage 16 are mated together, the leaf spring 15 provides a central spine that acts to pin the upper and lower portions of the contact cage together. FIG. 12D shows the relationship between the insulating cup and the contact cage, as the outboard flange of insulating cup 14 is received by the lower split portion of contact cage 16. In a similar manner, the upper split portion of contact cage 16, may be mated to the lower split portion of contact cage 16 to form the assembled structure shown in FIG. 12E. As shown, the first lateral end of leaf spring 15 is completely surrounded by the assembled upper and lower portions of contact cage 16; the second lateral end of leaf spring 15, however, is surrounded circumferentially by insulating cup 14, while its centered dome is visible through a lateral opening of the insulating cup.

Figure 12E:
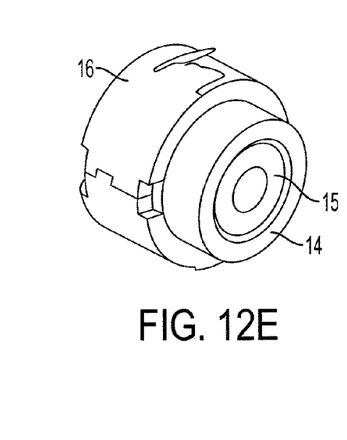
FIG. 12E shows an assembled contact cage and insulating cup, with a leaf spring nestled within the contact cage and the insulating cup, in accordance with an embodiment of the present invention.

As shown in FIG. 12E and FIGS. 5 and 6, the inward flange of insulating cup 14 has a longitudinal thickness which may be defined by a length measured from an exterior surface of the insulating cup. Due to this longitudinal thickness, the second lateral end of leaf spring 15 is recessed from the exterior surface of the insulating cup by this length measurement. Accordingly, when the positive terminal of battery 20 is properly inserted into battery sleeve 11, the positive terminal protrudes into the recess formed by the longitudinal dimension of inward flange 14b. Since the positive terminal of battery 20 includes a centered nipple, the recess permits the nipple to make electrical contact with the centered dome of leaf spring 15. Thus, a positive electrical path may be formed from the battery to the circuits of the device.

It will be appreciated, however, if battery 20 is incorrectly inserted into sleeve 11, for example by inserting the flat ended, negative terminal of battery 20 into sleeve 11, no electrical contact is made between the battery and the leaf spring. The conical geometry of insulating cup 14 allows the positive terminal of battery 20 to enter, but disallows contact of the negative terminal of the battery with the leaf spring.

The insulating cup includes a conical shape which aligns and centers the second lateral end of leaf spring 15, as shown in FIG. 12B. In addition, the outboard flange 14a forms a bearing surface, when installed at the next higher assembly of the device, and allows a sliding motion without requiring cocking, or jamming.

An exemplary assembly operation will now be described by still referring to FIG. 12A through FIG. 12E. First, the second lateral end of leaf spring 15 is inserted into insulating cup 14, as shown in FIG. 12D. Next, the outboard flange of insulating cup 14 is aligned with a corresponding circumferential opening in the lower split portion of contact cage 16, as shown in FIG. 12D. Then after, the upper split portion of contact cage 16 is joined with the lower split portion of contact cage 16, while allowing tab 15a of leaf spring 15 to protrude through the slotted opening of the upper split portion of contact cage 16, as shown in FIG. 12E.

This entire assembly may next be inserted into battery housing 10, as shown in FIGS. 4, 5 and 6. Battery sleeve 11, with its negative spring contact 13 soldered onto its outer cylindrical wall, may be pressure fitted into battery housing 10, as best shown in FIG. 5.

Figure 13:
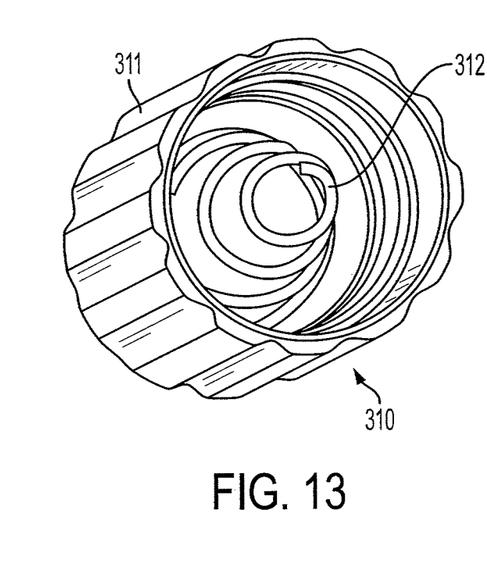
FIG. 13 is a perspective view of a battery cap assembly, which forms a negative terminal for a battery inserted in the battery sleeve.

The battery may be inserted next. The negative side of the battery may make electrical contact with spring 312 which forms part of battery cap assembly 310, as shown in FIG. 13. The battery cap assembly 310 includes a cap 311 and a coil spring 312 which fits inside cap 311. The cap 311 and coil spring 312 are both made of a conductive material. The inside diameter of cap 311 may be large enough to fit over battery sleeve 11, as shown in FIGS. 5 and 6. When battery cap assembly 310 threads onto the battery sleeve, the threads inside the battery cap engage the threads on the battery sleeve assembly. When the battery cap assembly 310 is fully engaged with the battery sleeve, coil spring 312 may press against the negative terminal of battery 20 and provide additional stability to the battery when shock or vibration is encountered by the device. Both coil spring 312 and leaf spring 15 provide battery stability.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An apparatus for inclusion in a battery housing comprising:
   a contact cage having two split portions mated together to form a longitudinal cylindrical enclosure, wherein a first portion of the split portions has a slotted opening;
   a leaf spring having first and second compressible ends, in which the first end of the spring is received by a second portion of the split portions of the contact cage, wherein:
      first end of the spring includes a protruding tab extending upwards for insertion in the slotted opening of the first portion of the two split portions of the contact cage, and
      the second end of the spring includes a dome; and
   a longitudinal insulating cup having two opposing cylindrical lateral openings, an outboard flange at an exterior of the longitudinal insulating cup at a first of the opposing cylindrical openings and an inward flange in the interior of the longitudinal insulating cup at a second of the opposing cylindrical openings, the outboard flange surrounded by the two split portions of the contact cage when mated together to form the longitudinal cylindrical enclosure, wherein the second end of the spring is received by the insulating cup through one of the lateral cylindrical openings and abuts the inward flange, wherein:
      the first end of the spring is held in position by the mated portions of the contact cage that forms the longitudinal cylindrical enclosure that surrounds the insulating cup,
      the dome at the second end of the spring is centered in the second opposing lateral cylindrical opening of the longitudinal insulating cup as a positive contact in the battery housing.

2. The battery housing of claim 1, further comprising:
   a longitudinal sleeve for receiving a AA battery,
   wherein the longitudinal insulating cap is configured to permit a positive terminal of the AA battery to contact the spring.

3. The battery housing of claim 1 wherein:
   each split portion of the two split portions of the contact cage has a respective pin and a respective receptacle, and
   the two split portions of the contact cage are mated together by engaging the respective pin of one split portion with the respective receptacle of the other split portion.

4. The battery housing of claim 1 wherein:
   the inward flange extends circumferentially from an interior wall of the insulating cup, and
   the inward flange centers the spring in the insulating cup.

5. The battery housing of claim 4 wherein:
   the inward flange has a longitudinal thickness measured from an exterior surface of the insulating cup, and the second end of the spring is recessed from the exterior surface of the insulating cup by the longitudinal thickness, wherein the longitudinal thickness has a dimension that permits a centered nipple of a AA battery to contact the second end of the spring.

6. The battery housing of claim 5 including:
   a longitudinal sleeve for receiving the AA-sized battery,
   wherein the insulating cup is configured to receive a positive terminal of the AA-sized battery near the inward flange to contact the domed second end of the spring.

7. The battery housing of claim 1 wherein:
   the inward flange prevents a AA-sized battery having a flat surface negative terminal from contacting the domed second end of the spring.

8. The battery housing of claim 1 wherein:
   the outboard flange extends circumferentially from a cylindrical wall of the insulating cup, and
   the mated contact cage is configured to nestle the outboard flange, with the insulating cup protruding through the lateral opening of the contact cage.

9. An apparatus, comprising:
   a cylindrical battery, wherein the cylindrical battery includes positive and negative terminals at opposite ends of the cylindrical battery; and
   a battery housing comprising:
   a contact cage having two split portions mated together to form a longitudinal cylindrical enclosure, wherein a first portion of the split portions has a slotted opening;
   a leaf spring having first and second compressible ends, in which the first end of the leaf spring is received by a second portion of the split portions of the contact cage, wherein:
      the first end of the leaf spring includes a protruding tab extending upwards for insertion in the slotted opening of the first portion of the two split portions of the contact cage, and the second end of the leaf spring includes a dome;
   a longitudinal insulating cup having two opposing cylindrical lateral openings, an outboard flange at an exterior of the longitudinal insulating cup at a first of the opposing cylindrical openings and an inward flange in the interior of the longitudinal insulating cup at a second of the opposing cylindrical openings, the outboard flange surrounded by the two split portions of the contact cage when mated together to form the longitudinal cylindrical enclosure, wherein the second end of the leaf spring is received and held by the insulating cup through one of the lateral cylindrical openings and abuts the inward flange, wherein:
      the first end of the leaf spring is held in position by the mated portions of the contact cage that forms the longitudinal cylindrical enclosure that surrounds the insulating cup,
      the dome at the second end of the leaf spring is centered in the second opposing lateral cylindrical opening of the longitudinal insulating cup as a positive contact in the battery housing, and
      the second end of the leaf spring is configured to mate with the positive terminal of the battery; and
   a tubular sleeve positioned opposite the contact cage for holding the cylindrical battery to facilitate connection with the negative terminal of the battery.

10. The apparatus of claim 9, wherein:
    the cylindrical battery includes a nipple protruding from a flat surface at a first end of the cylindrical battery forming the positive terminal of the cylindrical battery and a flat surface at a second end of the cylindrical battery forming the negative terminal, the insulating cup includes an inward flange abutting the second end of the leaf spring and providing a space between the second end of the spring and the flat surface of the cylindrical battery, and the nipple of the cylindrical battery extends into the space formed by the inward flange and contacts the second end of the leaf spring, thereby making electrical contact between the positive terminal of the battery and the positive electrical contact of the spring.

11. The apparatus of claim 9, wherein:

each of the two split portions of the contact cage includes a pin and a receptacle for inter-locking the two split portions of the contact cage together when mated to form the first cylindrical sleeve.

12. The apparatus of claim 11, wherein:

the first end of the leaf spring includes a protruding tab, and the protruding tab is configured to extend through the slotted opening of the first portion of the two split portions of the contact cage, when the first end of the leaf spring is fixed by the mated two split portions of the contact cage.

13. The apparatus of claim 9, wherein:

the leaf spring is formed from an electrically conductive material, the contact cage is formed from an electrical insulated material, and the insulating cup is formed from an electrical insulator material.

14. The battery housing of claim 9, wherein:

the two split portions of the contact cage are formed by injection molding.

15. The apparatus of claim 9, including:

a groove formed integrally on an exterior surface of the tubular sleeve, and a negative spring contact welded to the groove for providing a negative contact for the battery.

* * * * *